United States Patent [19]
Palko

[11] Patent Number: 4,798,184
[45] Date of Patent: Jan. 17, 1989

[54] EXTENDED EXPANSION DIESEL CYCLE ENGINE

[76] Inventor: Sandor Palko, P.O. Box 8139, Honolulu, Hi. 96830-0139

[21] Appl. No.: 931,536

[22] Filed: Nov. 17, 1986

[51] Int. Cl.[4] .......................... F02D 39/06; F01L 1/44
[52] U.S. Cl. .................................... 123/316; 123/501
[58] Field of Search ................ 123/182, 316, 500, 501

[56] References Cited

U.S. PATENT DOCUMENTS

| | | | |
|---|---|---|---|
| 2,344,993 | 3/1944 | Lysholm | 123/316 X |
| 2,796,054 | 6/1957 | Miller | 123/316 X |
| 2,817,322 | 12/1957 | Miller | 123/316 |
| 3,015,934 | 1/1962 | Miller | 123/316 X |
| 3,057,336 | 10/1962 | Hatz, Jr. | 123/316 X |
| 3,986,351 | 10/1976 | Woods et al. | 123/316 X |
| 4,476,837 | 10/1984 | Salzgeber | 123/501 X |
| 4,619,228 | 10/1986 | Liu | 123/182 |

Primary Examiner—Willis R. Wolfe, Jr.

[57] ABSTRACT

An extended expansion diesel cycle engine which achieves a fuel efficiency materially higher than that of an engine operating on the conventional diesel cycle. A venting valve means is operated to provide a selectable ratio of predetermined pre-compression swept volume (C) versus work producing expansion swept volume (E) in a range of substantially between 1:1.2 and 1:3. Suitable selection of this C/E ratio ensures expansion of the combustion gases to a significantly greater volume than the pre-compression volume of the original air charge, effecting a predictable drop in temperature and pressure of the wasted exhaust gases. The extended expansion feature produces the feasibility of having a fuel delivery means timed to ensure exclusively after top dead center (ATDC) fuel ignition and combustion, thereby reducing heat dissipation, thus limiting cooling loss and significantly improving torque potential.

13 Claims, 2 Drawing Sheets

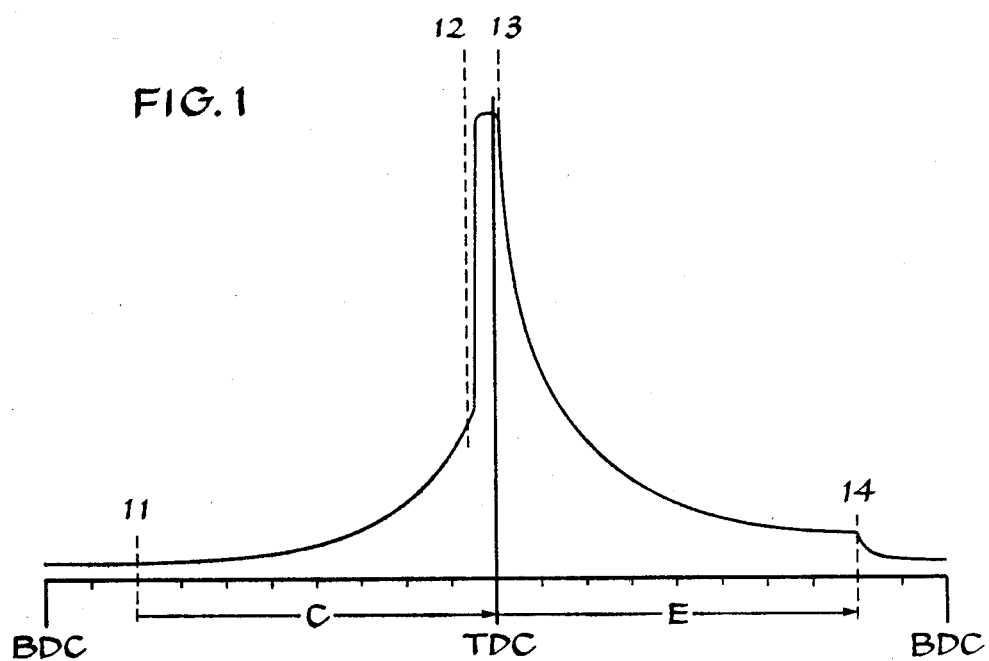
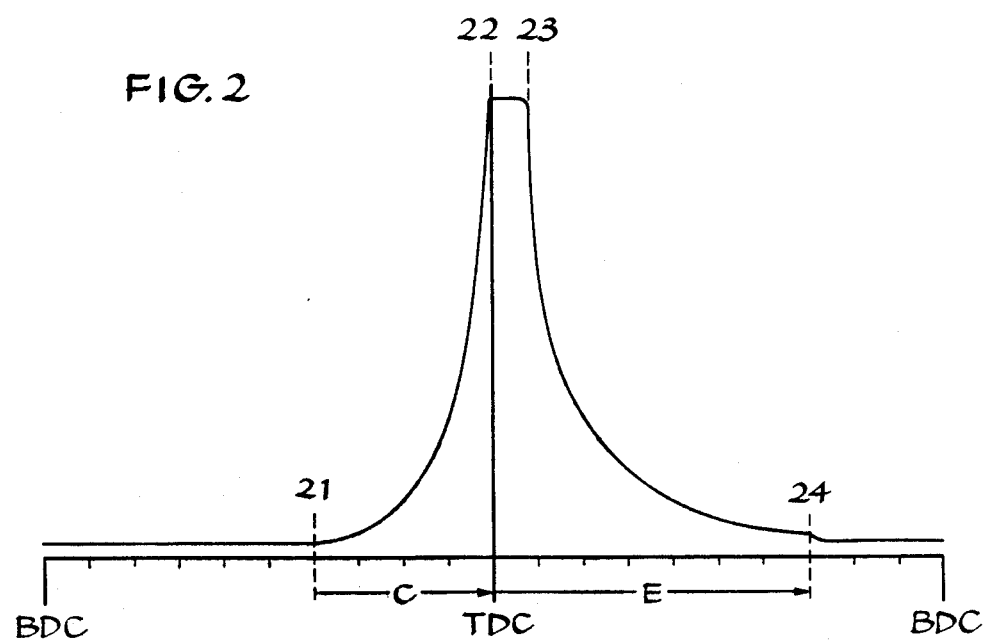

FIG. 3
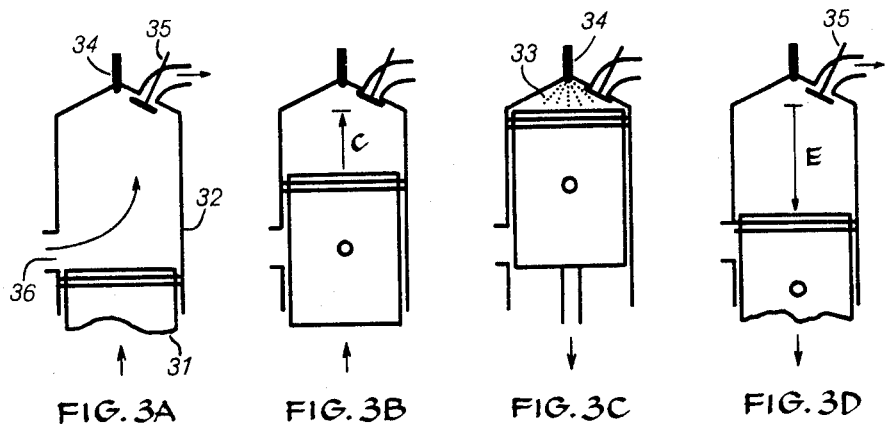
FIG. 3A  FIG. 3B  FIG. 3C  FIG. 3D
FIG. 4
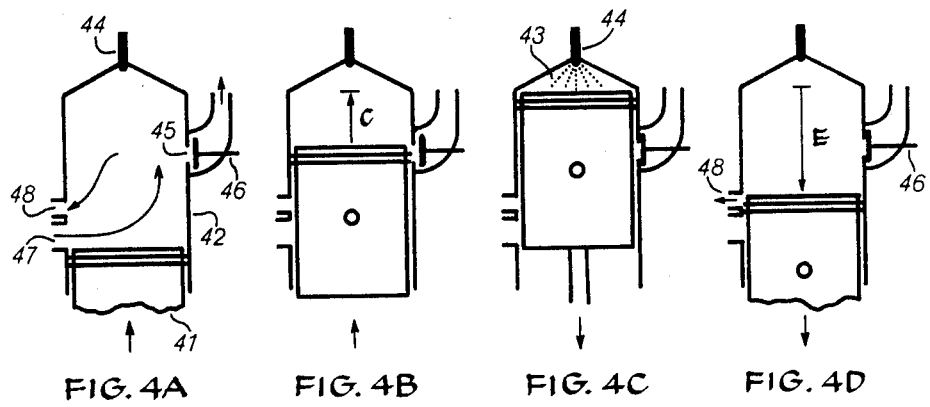
FIG. 4A  FIG. 4B  FIG. 4C  FIG. 4D
FIG. 5
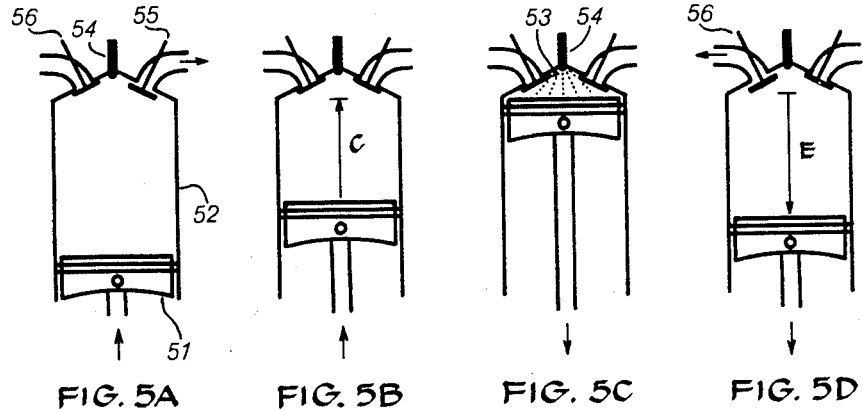
FIG. 5A  FIG. 5B  FIG. 5C  FIG. 5D

EXTENDED EXPANSION DIESEL CYCLE ENGINE

TECHNICAL FIELD

This present invention is related to internal combustion reciprocating piston engines, including both two-stroke and four-stroke diesel cycle designs where the full compression of the air charge to a desired degree, followed by compression ignition of the injected fuel, and subsequent expansion of the combustion gases are all taking place in the same combustion chamber.

BACKGROUND

Examination of reciprocating piston, two-stroke and four-stroke diesel cycle engine designs of previous art reveal two significant disadvantages in common.

One significant disadvantage of previous art is that during the compression stroke, the pre-compression swept volume (C) utilized to compress the air charge present to the desired maximum compression pressure is substantially the same, at best, as the expansion swept volume (E) available to subsequently expand the combustion gases during the expansion stroke, a C/E ratio of substantially 1:1. And as such, the exhaust gas temperatures and pressures of these engines are high, wasting heat energy, and further, burning the exhaust valves, a well recognized cause of engine failure.

In this respect, there have been innovations in previous art to recover or reuse the energy of the exhaust gases, but only after first discharging the gases from the combustion chamber, to drive a scavenging blower or a supercharger, as examples.

Another significant disadvantage of engine designs of previous art, a legacy of the C/E ratio of 1:1, is the necessity to commence fuel injection, initiating rapid combustion, substantially before top dead center (BTDC). Of course, in these C/E 1:1 engines, combustion must be initiated BTDC, and after top dead center (ATDC) injection/combustion is to be curtailed as the only means to prevent skyrocketing exhaust temperatures. But to initiate combustion BTDC and culminate fuel injection/combustion just when the piston literally sits at TDC is indeed a very unfortunate necessity; indeed, a very old dilemma.

SUMMARY OF THE INVENTION

This present invention is an improvement upon the traditional implementation of the classical diesel cycle by engine designs of previous art, which is devoid of the above noted disadvantages.

This invention employs a new extended expansion diesel cycle, which I shall name, in an abbreviated and collective term, the "EE cycle," developed to improve the expected operational reliability and fuel efficiency of any reciprocating piston diesel engine design by incorporation of this EE cycle as a definitive means for its operation.

A fundamental design feature of this EE cycle is the work producing expansion of the combustion gases to a significantly greater volume than the pre-compression volume of the original air charge. An essential effect of such extended expansion is a predictable drop in temperature and pressure of the wasted exhaust gases along with a corresponding improvement in thermal efficiency.

For this EE cycle, the proposed volumetric relationship of pre-compression swept volume (C) of the compression stroke, versus the expansion swept volume (E) of the expansion stroke is a selectable C/E ratio of substantially between 1:1.2 and 1:3. By comparison, the volumetric ratios applied in diesel engine designs of previous art are substantially 1:1.

A significant feature of this EE cycle is its hitherto prohibited fuel injection timing. This EE cycle prescribes that at the end of every compression stroke, the beginning of fuel injection into the combustion chamber shall be substantially at top dead center (TDC) which ensures only ATDC ignition, and that fuel injection may continue in a manner to maintain a constant pressure-variable volume combustion approaching the ideal diesel cycle.

Because of the extended expansion feature of this EE cycle, the prescribed ATDC ignition and the sought after long-ATDC fuel injection/combustion does not produce the skyrocketing exhaust gas temperature as in conventional designs. Moreover, this fuel injection timing eliminates a host of menacing aspects posed by BTDC ignition in practical engine operation of previous art.

Another design feature of this EE cycle is its inherent potential to compensate for the negative effect of lower than sea level static pressure which occurs at higher ground elevations. This compensating capability is directly related to the volumetric C/E ratio selected, a 1:3 ratio offering the greatest possible compensating range.

Synergistically, these features significantly improve fuel efficiency and operational reliability for otherwise conventionally built diesel engines.

BRIEF DESCRIPTION OF THE DRAWINGS

FIG. 1 is a pressure-volume schematic of a conventional C/E 1:1, four-stroke diesel cycle engine;

FIG. 2 is a pressure-volume schematic of an extended expansion diesel or EE cycle engine;

FIGS. 3A-3D are operational schematics of a two-stroke extended expansion diesel or EE cycle engine according to one embodiment of this invention, featuring an exemplary 1:1.75 C/E ratio;

FIGS. 4A-4D are operational schematics of a two-stroke extended expansion diesel or EE cycle engine according to another embodiment of this invention, featuring an exemplary 1:2 C/E ratio; and FIGS. 5A-5D are operational schematic, of a four-stroke extended expansion diesel or EE cycle engine according to another embodiment of this invention, featuring an exemplary 1:1.2 C/E ratio.

DETAILED DESCRIPTION

FIG. 1 is a pressure-volume schematic of a conventional C/E 1:1, four-stroke diesel cycle design. The diagram illustrates that on the compression stroke, when the intake valve closes (11), the pre-compression swept volume (C) is 80% of the cylinder swept volume. At approximately 27° crank angle BTDC (12), fuel delivery commences into the combustion chamber, and following ignition delay, the accumulated fuel detonates and pressure rises abruptly to maximum value. All of this happens BTDC, only a negligible amount of fuel injection/combustion taking place ATDC; 3°, illustrated).

As shown, the work producing expansion swept volume (E) is also 80% of the cylinder swept volume, hence, C/E 1:1. As the exhaust valve opens (14), the exhaust gas pressure is still high, wasting considerable energy and requiring a bulky muffler system to tame the energetic gases.

FIG. 2 is a pressure-volume schematic of an extended expansion diesel or EE cycle engine featuring an exemplary 1:1.75 C/E ratio, selected from the proposed C/E range of 1:1.2 to 1:3, applicable to both two- and four-stroke designs. It illustrates the fundamental feature of the EE cycle, that no compression occurs until the venting valve closes (21), which only closes while the piston is travelling between BDC and TDC when the cylinder swept volume has been reduced to a predetermined pre-compression swept volume (C) which is no less than about one-third and no greater than about five-sixths of the work producing expansion swept volume (E) of the engine, as called for in this instance to satisfy the selected C/E ratio of 1:1.75. Since the exemplary work producing expansion swept volume (E) is 70% of the cylinder swept volume, the utilized pre-compression volume (C) will be 40% of the cylinder swept volume.

An exemplary volume calculation:
if a given EE cycle engine's cylinder swept volume is 2000 cc, and
if the given work producing expansion utilizes 70% of the cylinder swept volume,
then the utilized work producing expansion swept volume (E) is 1400 cc, and
if the selected C/E ratio is 1:1.75,
then this predetermines the utilized pre-compression swept volume (C) to be 800 cc, since 1:1.75=×:1400.

Further, this predetermined pre-compression swept volume will predetermine, in conjunction with the desired diesel compression ratio, the minimum combustion chamber volume.

As shown, during the first 60% of the compression stroke, the venting valve provides air venting communication from the combustion chamber. When the venting valve closes, the actual adiabatic compression of the air charge present is then accomplished during the remainder of the compression stroke to the desired diesel compression ratio, attaining a maximum compression pressure while the piston is at TDC.

A significant feature of this EE cycle is its fuel injection timing. As illustrated, fuel delivery begins substantially at the end of the compression stroke, when the piston is at TDC(22). As the piston begins its work producing expansion stroke, pressure may initially drop during ignition lag, then a nearly constant pressure combustion is sustained by an effective fuel delivery unit until approximately 30° crank angle ATDC (23) when fuel delivery and combustion ceases, as shown. At the end of the work producing extended expansion, when the exhaust valve means opens (24), the wasted exhaust gas pressure is low.

FIGS. 3, 4 and 5 show three embodiments of the EE cycle, as incorporated into engines representing three major types distinguished by aspiration technique.

FIG. 3 shows a schematic arrangement of a two-stroke EE cycle, C/E 1:1.75 engine with a uniflow scavenging design. Uniflow scavenging engines commonly employ multiple exhaust valves in the minimum combustion chamber envelope (cylinder head) and multiple scavenging air inlet ports in the cylinder wall near BDC to enhance satisfactory aspiration. However, uniflow scavenging engines of previous art commonly feature a C/E ratio of substantially 1:0.7, and as such, their exhaust gas pressures are excessively high, and importantly, the excessive exhaust gas back pressure hinders rapid aspiration of the combustion chamber. In these conventional engines, in order to lessen the effect of the exhaust gas back pressure, the exhaust valves are opened substantially before the scavenging air inlet ports are uncovered; the net result is that only about 65% of the cylinder swept volume is utilized for work producing expansion.

By contrast, in the EE cycle engines, the combined effect of the low exhaust gas back pressure produced by extended expansion, and the further venting of the cylinder by the venting valve action presents the opportunity to utilize significantly more of the cylinder swept volume for work producing expansion. Employing proven uniflow scavenging techniques, these EE cycle engines can utilize up to about 85% of the cylinder swept volume for work producing expansion while retaining satisfactory aspiration. FIG. 3 features a conservative 70% utilization.

FIG. 3A shows that the aspiration of the combustion chamber is in progress; the piston 31 is at BDC in the cylinder 32 at the commencement of the compression stroke, a cylinder port 36 provides an inlet for the scavenging air, and a venting valve 35, in an open position, provides an outlet from the combustion chamber; the valve timing will keep the venting valve in an open position until the piston reduces the cylinder swept volume to the utilized pre-compression volume.

FIG. 3B shows that at the instant the venting valve closes, thus marking the utilized pre-compression swept volume C as the combustion chamber is sealed, the piston is enabled to perform adiabatic compression of the air present for the remainder of the compression stroke.

FIG. 3C shows that the piston is at TDC, compression pressure is at maximum in the minimum combustion chamber 33, and delivery of fuel by the fuel injector 34 commences into the combustion chamber where the fuel self-ignites as the work producing expansion stroke begins.

FIG. 3D shows the instant the venting valve opens to provide the exhaust gas discharge, thus functions as an exhaust valve, marking the work producing expansion swept volume E and the beginning of the aspiration of the combustion chamber as the piston travels to BDC to begin another extended expansion cycle.

In this embodiment of the EE cycle, it becomes apparent that either the prescribed venting valve means can additionally assume the exhaust valve function or the exhaust valve means can additionally assume the venting valve function, the choice of description being of no consequence to the cycle. However, it is conceivable to employ separate venting valve means and exhaust valve means for this type of EE cycle engines. In this case, the exhaust valve opens before the scavenging inlet ports are uncovered and closes at about the same time that the scavenging ports are covered by the piston; the venting valve opens during the aspiration period and closes a required by the C/E ratio selected.

FIG. 4 shows a schematic arrangement of a two-stroke EE cycle, C/E 1:2 engine with a cylinder ports-loop scavenging design. Without incorporating the EE cycle, conventional engines of this type inherently have C/E 1:1 ratios.

To operate an engine of this type in accordance with this invention, it is necessary to provide at least one additional piston controlled venting port disposed in the cylinder wall so that the piston completely covers, thus closes, the venting port at the instant the cylinder swept volume has been reduced to the predetermined pre-compression swept volume (C). Furthermore, this venting port needs to be controlled additionally by a venting valve. At the beginning of the compression stroke, the venting valve timing will ensure that the venting valve opens before the piston covers the exhaust gas exit port and closes after the piston has covered the venting port, and that the venting valve is kept closed at least until the piston uncovers the exhaust gas exit port during the subsequent expansion stroke.

FIG. 4A shows that the aspiration of the combustion chamber is in progress; the piston 41 is at BDC upon commencement of the compression stroke, the cylinder 42 having at least one scavenging air inlet port 47 and at least one exhaust gas exit port 48 and a venting port 45, and the venting valve 46 is in an open position and is operative to control the venting port 45.

FIG. 4B shows that the piston has reduced the cylinder swept volume to the predetermined pre-compression swept volume C and completely closes the venting port 45 to be followed by closing of the venting valve 46; all cylinder ports are now closed and the piston is enabled to perform adiabatic compression of the air charge present to a desired degree.

FIG. 4C shows that the piston is at TDC, compression pressure is at maximum in the minimum combustion chamber 43, and the fuel injector 44 commences delivery of fuel into the combustion chamber where the fuel self-ignites as the work producing expansion stroke begins.

FIG. 4D shows that the piston is about to uncover or open the exhaust gas exit port, marking the work producing expansion swept volume E, further movement of the piston initiating the engine's aspiration period; the venting port 46 is still in a closed position.

Similarly, as in the case of uniflow scavenging designs in FIG. 3, the combined effect of lower exhaust gas back pressure and the further venting of the combustion chamber by the venting port enhances the effective aspiration of the engine, offering the opportunity to utilize up to about 85% of the expansion stroke for work producing expansion, 70% utilization shown in FIG. 4.

In this cylinder ports-loop scavenging two-stroke embodiment of the EE cycle, it is proposed that the piston controlled venting port in the cylinder be situated so as to be closed by the piston at the instant the predetermined pre-compression swept volume C is reached. Since the venting valve itself can be timed to close this venting port at any desired time, this port could be located anywhere in the combustion chamber, although the position featured in FIG. 4 is recommended. As situated in FIG. 4, the venting port is in a timely position at the boundary of the predetermined pre-compression swept volume. As such, when the piston uncovers this venting port during the expansion stroke, the temperature and pressure of the combustion gases have been reduced to a nearly equivalent force of the exhaust gases normally produced at the time of discharge from a conventional C/E 1:1 engine. This significantly reduces the thermal and mechanical stress on this venting valve as compared to a valve situated in the cylinder head.

As illustrated in FIG. 4, the exemplary poppet valve 46 opens outward to eliminate any possible interference with the piston. Either sliding or rotating valves would also serve well in this location.

FIG. 5 shows a schematic of a four-stroke embodiment of an EE cycle engine having a C/E 1:1.2 ratio, four-stroke engines commonly having at least one intake and one exhaust valve situated in the minimum combustion chamber envelope (cylinder head). In this (FIG. 5) embodiment, the intake valve also functions as the venting valve means for the cycle, although a distinct venting valve might be added as an alternative. In such a case, during the compression stroke, the timing of this distinct venting valve will ensure that it will be open before the intake valve closes, and that it will close as required by the C/E ratio selected.

FIG. 5A illustrates the beginning of the compression stroke when the piston 51 is at BDC in the cylinder 52. The intake valve 55 is in an open position and will remain open to function as a venting valve until piston movement toward TDC reduces the cylinder swept volume to the pre-compression swept volume C.

FIG. 5B illustrates the instant that the intake valve functioning as a venting valve, closes, the piston defining the pre-compression swept volume C.

FIG. 5C illustrates that the piston is at TDC, compression pressure is at maximum in the minimum combustion chamber 53, and the fuel injector 54 commences delivery of fuel into the combustion chamber where the fuel self-ignites upon commencement of the expansion stroke.

FIG. 5D illustrates the instant the exhaust valve 56 opens, marking the work producing expansion swept volume E, further movement of the piston toward BDC initiating the aspiration period of subsequent exhaust and intake strokes, after which the entire cycle is repeated.

In this embodiment of the EE cycle, the utilization of the cylinder swept volume for work producing expansion is proposed to be maximized, FIG. 5 illustrating a conservative 80% utilization.

To be included in the four-stroke embodiments of this invention is the case where there is a common exhaust and intake valve and port, providing exhaust and intake functions alternately (mostly aero-engine applications). In this case, the exhaust/intake valve combination will assume the venting valve function, and its timing will ensure that it will be closed during the compression stroke at the appropriate time to provide the desired C/E ratio.

Fundamental to the EE cycle is the selectable C/E range of substantially between 1:1.2 and 1:3, the appropriate timing of the venting valve means providing a maximum and minimum for the predetermined pre-compression swept volume with respect to the work producing expansion swept volume. A further refinement of this provision will make this utilized pre-compression swept volume potentially continuously variable between the predetermined and the maximum pre-compression swept volume. This refinement has been developed for the EE cycle as an optional feature to be able to compensate for the negative effect of lower than sea level static air pressure which commonly occurs at higher ground elevations.

As examples, this feature will make a C/E 1:1.5 potentially 1:1.5-1, and a C/E 1:1.75 potentially 1:1.75-1, and a C/E 1:3 potentially 1:3-1.

Theoretically, an EE cycle C/E 1:1.2-1 engine has the potential to compensate for a 20% drop in static air pressure corresponding to an elevation of about 6600 ft.; a C/E 1:1.75-1 engine can compensate for a 42% pressure drop at about 14,700 ft.; and a C/E 1:3-1 engine can compensate for a 66% pressure drop at about 27,500 ft.

For this purpose, an applicable range of compensation for atmospheric pressure changes can be actualized, for example, by a pressure-sensing means and activating mechanism which on demand will vary the timing of the venting valve so as to close earlier than prescribed by the C/E ratio selected, in order to utilize appropriately more of the cylinder swept volume for the pre-compression volume as needed to compensate for the static air pressure drop. Such action will, of course, raise the compression ratio, but in effect, will merely maintain the respective sea level compression pressure.

Theoretical and practical engineering considerations on the new EE cycle engine

Prescribing exclusive ATDC combustion may at first glance raise the spectra of grossly reduced effective compression ratio, thus reduced cycle efficiency, but because of the selectable C/E of 1:1.2 to 3, the actual compression ratio will be multiplied by the value of the selected E, and the actual compression ratio is recommended to be maximized up to the permissible limit of the engine's structural strength, thus further enhancing the effective compression ratio Terminology $r$ = compression ratio
$V_2$ = volume at end of compression
$V_3$ = volume at end of constant pressure combustion
$\overline{CO} = V_3/V_2$; ATDC combustion period, estimated to be between 1 and 3
$k = 1.35$ constant $$n = \text{air cycle efficiency} = 1 - \frac{1}{\frac{r}{\overline{CO}}E}\,k-1$$

EXAMPLE I

A convention 2-stroke diesel engine
$r = 17.5$, $\overline{CO} = 1.15$, $C/E = 1:0.7$ $$n = 1 - \frac{1}{\frac{17.5}{1.15}\,0.7}\,.35 = 0.56$$

An engine such as this, operates at approximately 31% overall fuel efficiency. At 1200 RPM, it has an approximately 37 bar compression pressure and a firing pressure of approximately 72 bar. An oscilloscope view of the TDC region shows that injection starts at $-25°$ BTDC, full 72 bar combustion pressure by $-20°$, sustained 72 bar until $+5°$ ATDC, after which the pressure drops rapidly. The estimated heat loss to cooling while the piston loiters at TDC is 11% with 0 net work.

Conversion of the above engine to EE cycle configuration would begin with C/E ratio selection. Generally, a C/E of around 1:1.2 to 1.4 would be the choice, if power output is to be close to original output; a C/E range of around 1:1.5 to 1.8 provides the best balance between reasonable power output and fuel efficiency; the higher C/E 1:2+ ratios would be used for special applications where superior fuel efficiency can outweight the greatly reduced power capability. Traditionally, high power output engines, as in Example I, have a continuous power rating of 75%, an EE cycle conversion to match this rated power output would use a C/E of 1:1.5 to 1.6.

EXAMPLE II

An EE cycle conversion of the engine described in Example I $r = 24$, $\overline{CO} = 2.2$, $C/E = 1:1.6$ $$n = 1 - \frac{1}{\frac{24}{2.2}\,1.6}\,.35 = 0.63$$

An EE cycle engine such as this has an overall fuel efficiency of at least 42%, maximum power output of approximately 70% of the original power. The compression ratio of 24:1 is chosen so as to approximate the 72 bar working pressure limit of the engine. Heat loss to cooling during the combustion period is estimated to be reduced from 11% to 7%.

A characteristic of the EE cycle engine is that the maximum output and the rated output are the same.

Significant potentialities exist for EE cycle engine designs;

It will now be possible to build lightweight, high speed EE cycle diesel engines. Since there is no pressure rise above compression pressure during combustion, EE cycle diesel engines weighing not more than conventional spark ignition types can provide the necessary compression for diesel operation.

EE cycle engines have an inherent tolerance for fuel quality. Randomly varying ignition delay has little effect on engine performance, while the prescribed high compression pressure tends to produce excess temperature to ignite a variety of fuels rapidly.

The aspect of inherent compensating capabilities for atmospheric pressure changes together with the aforementioned characteristics of lightweight construction and fuel tolerance make the EE cycle diesel engine design suitable for aero-engine application.

I claim:

1. An extended expansion method of operating a diesel cycle engine, said engine including at least one reciprocating piston-cylinder-combustion chamber-fuel injection means-venting valve means system, said method of operation comprising;

operating said venting valve means and valve timing means to provide air venting communication from said combustion chamber by maintaining said venting valve means in an open position during an initial portion of the compression stroke, as said piston travels in said cylinder from bottom dead center toward top dead center, until said piston reduces the cylinder swept volume to a predetermined pre-compression swept volume which is no less than substantially one-third of the work producing expansion swept volume of said engine and no greater than substantially five-sixths of said work producing expansion swept volume;

closing said venting valve means when said cylinder swept volume has been reduced to said predetermined pre-compression swept volume, thus sealing said combustion chamber, so that said piston is enabled to perform adiabatic compression of the air in said combustion chamber on the remainder of said compression stroke, the minimum combustion chamber volume being limited with respect to said predetermined pre-compression swept volume so as to ensure a substantial compression ratio essential for compression ignition in said diesel cycle engine;

providing fuel injection timing for operating said fuel injection means to commence delivery of fuel into said combustion chamber when said piston is substantially at top dead center of said compression stroke, and to continue delivery of fuel for a predetermined period thereafter, substantially until conditions sustain rapid burning of the injected fuel, said work producing expansion swept volume providing said extended expansion for the combustion gases, as said piston travels toward bottom dead center; and commencing exhaust discharge when said piston has reached the limit of said expansion swept volume, marking the end of the work producing expansion and the start of the respective aspiration means for said engine.

2. The invention of claim 1, wherein said valve timing means includes means for varying on demand said predetermined pre-compression swept volume between said predetermined swept volume and substantially said work producing expansion swept volume by operating said venting valve means to close; and wherein said step of operating includes the step of terminating the venting of said combustion chamber at an earlier position of said piston than required by said predetermined pre-compression swept volume.

3. A method of operating an engine in accordance with claim 1, wherein said engine is a two-stroke design having at least one piston controlled scavenging air inlet port disposed in the cylinder wall near bottom dead center, said venting valve means controls communication from the minimum combustion chamber envelope; and wherein said step of commencing exhaust discharge is performed by said venting valve means and valve timing means before said piston uncovers said scavenging air inlet port during the expansion stroke.

4. A method of operating an engine in accordance with claim 1, wherein said engine is a two-stroke design having at least one piston controlled scavenging air inlet port and at least one exhaust gas exit port with both ports disposed in the cylinder wall near bottom dead center, also having at least one piston controlled venting port disposed in the cylinder wall, so that said piston completely covers or closes said venting port at the instant said piston has reduced said cylinder swept volume to said predetermined pre-compression swept volume according to claim 1;

said venting valve means is situated so as to control said venting port passage;

wherein said step of operating includes the step of opening said venting valve means before said piston closes said exhaust gas exit port; said step of closing includes the step of closing said venting valve means after said piston closes said venting port during the compression stroke; and said step of commencing exhaust discharge is preceded by the step of maintaining said venting valve means in a closed position at least until said piston opens said exhaust gas exit port at the end of the subsequent work producing expansion stroke.

5. A method of operating an engine in accordance with claim 1, wherein said engine is a four-stroke design having at least one exhaust valve means and at least one venting valve means situated to communicate from the minimum combustion chamber envelope;

and wherein said venting valve means and valve timing means additionally assume the intake valve function for said engine.

6. A method of operating a diesel cycle engine having at least one reciprocating piston-cylinder-combustion chamber-fuel injection means-valve means combination, said method comprising the steps of;

venting the cylinder during the compression stroke by maintaining said valve means in an open position during an initial portion of piston movement from bottom dead center position toward the top dead center position until the piston reaches a first intermediate position at which the swept volume of the cylinder is reduced to a predetermined pre compression swept volume;

sealing the cylinder by closing said valve means when the piston reaches said first intermediate position to enable the piston to perform adiabatic compression of the air in the combustion chamber during further motion of the piston to the top dead center position;

operating the fuel injection means to introduce fuel into the combustion chamber as the piston substantially reaches the top dead center position and for a predetermined period thereafter while maintaining the cylinder sealed so that extended expansion of the combustion gases occurs; and opening an exhaust valve means after the piston reaches a second intermediate position between top dead center and bottom dead center to initiate aspiration for the cylinder, said second intermediate position defining the expansion swept volume of the engine.

7. The method of claim 6 wherein said first and second intermediate positions are selected so that the ratio between the pre-compression swept volume and the expansion swept volume is in the range from about 1:1.2 and 1:3.

8. The method of claim 6 wherein said predetermined period is no longer than about 30° after top dead center.

9. In a diesel cycle engine, having at least one reciprocating piston cylinder-combustion chamber-fuel injection means-valve means combination, the improvement comprising;

valve timing means for said valve means for venting said combustion chamber by maintaining said valve means in an open position during an initial portion of the compression stroke, as said piston travels in said cylinder from bottom dead center toward top dead center, until said piston reduces the cylinder swept volume to a predetermined pre-compression swept volume which is no less than substantially one-third of the work producing expansion swept volume of said engine and is no greater than substantially five-sixths of said work producing expansion swept volume, and for sealing said combustion chamber thereafter so that said piston is enabled to perform adiabatic compression of the air in said combustion chamber on the remainder of the compression stroke, the minimum compression chamber volume being limited with respect to said predetermined pre-compression swept volume so as to ensure a substantial compression ratio essential for compression ignition in said diesel cycle engine; and fuel injection timing means for operating said fuel injection means to commence delivery of fuel into said combustion chamber when said piston is substantially at top dead center of said compression stroke, and for continuing delivery of fuel for a predetermined period thereafter, substantially until conditions sustain rapid burning of the injected fuel, said work producing expansion swept volume providing said extended expansion for the combustion gases as said piston travels toward bottom dead center;

commencement of said valve timing means permitting the exhaust gas discharge when said piston has reached the limit of said expansion swept volume, marking the end of the work producing expansion and the start of the respective aspiration means for said engine.

10. The invention of claim 9 wherein said valve timing means includes means for varying on demand said predetermined pre-compression swept volume between said predetermined pre-compression swept volume and substantially said work producing expansion swept volume by operating said valve means to close, thus terminating the venting of the combustion chamber at an earlier position than required by said predetermined pre-compression swept volume.

11. The invention of claim 9 wherein said diesel cycle engine is a two-stroke design, having at least one exhaust valve means situated to communicate from the minimum combustion chamber envelope and at least one piston controlled scavenging air inlet port disposed in the cylinder wall near bottom dead center; and wherein said exhaust valve means and said valve timing means additionally assume said valve means venting function during the compression stroke and operating as recited in claim 9.

12. The invention of claim 9 wherein said diesel cycle engine is a two-stroke design having at least one piston controlled scavenging air inlet port and at least one exhaust gas exit port, both ports disposed in the cylinder wall near bottom dead center;

wherein said engine further includes at least one piston controlled venting port which opens into the combustion chamber and is disposed in the cylinder wall so that said piston completely covers or closes said venting port at the instant said piston has reduced said cylinder swept volume to said predetermined pre-compression swept volume according to claim 9;

said valve means being operatively associated with said venting port, said valve timing means being operative to open said valve means before said piston closes said exhaust gas exit port, and to close said valve means after said piston closes said venting port during the compression stroke, and to maintain said valve means in a closed position at least until said piston opens said exhaust gas exit port at the end of the subsequent work producing expansion stroke.

13. The invention of claim 9 wherein said diesel cycle engine is a four-stroke design, having at least one exhaust valve means and one intake valve means situated to communicate from the minimum combustion chamber envelope;

and wherein said intake valve means and valve timing means additionally assume said valve means venting function during the compression stroke and operating as recited in claim 9.

* * * * *